United States Patent
Murakami

(10) Patent No.: US 7,203,757 B2
(45) Date of Patent: Apr. 10, 2007

(54) DEVICE, METHOD AND PROGRAM FOR PROTOCOL TRANSLATION

(75) Inventor: Takuya Murakami, Tokyo (JP)

(73) Assignee: NEC Corporation, Tokyo (JP)

( * ) Notice: Subject to any disclaimer, the term of this patent is extended or adjusted under 35 U.S.C. 154(b) by 698 days.

(21) Appl. No.: 10/145,150

(22) Filed: May 15, 2002

(65) Prior Publication Data

US 2002/0174233 A1   Nov. 21, 2002

(30) Foreign Application Priority Data

May 16, 2001   (JP)   ............... 2001-145880

(51) Int. Cl.
*G06F 15/16* (2006.01)
(52) U.S. Cl. .............. 709/230; 709/230; 709/231; 709/236; 709/246; 370/464; 370/466
(58) Field of Classification Search ............... 370/464, 370/466; 709/230–231, 236, 246
See application file for complete search history.

(56) References Cited

U.S. PATENT DOCUMENTS

| | | | | |
|---|---|---|---|---|
| 5,673,322 A | * | 9/1997 | Pepe et al. ............... | 705/52 |
| 6,279,140 B1 | * | 8/2001 | Slane ....................... | 714/807 |
| 6,370,583 B1 | * | 4/2002 | Fishler et al. ............. | 709/238 |
| 6,389,462 B1 | * | 5/2002 | Cohen et al. .............. | 709/218 |
| 6,704,786 B1 | * | 3/2004 | Gupta et al. .............. | 709/228 |

FOREIGN PATENT DOCUMENTS

JP   2002-281104   9/2002

OTHER PUBLICATIONS

Braden, RFC 1379, Extending TCP for Transactions—Concepts, Nov. 1992.*
Stacey, T/TCP: TCP for Transactions, Nov. 1999, Linux Gazette, Issue 47.*
Braden, RFC 1379, Extending TCP for Transactions—Concepts, Nov. 1992.*
Braden, RFC 1644, T/TCP—TCP Extensions for Transactions, Jul. 1994.*
Stacey, T/TCP: TCP for Transactions, Nov. 1999, Linux Gazette, Issue 47.*
Stevens. TCP/IP Illustrated. 1994. Addison Wesley. vol. 1. pp. 351-354.*
Kuhn. T/TCP—TCP for Transaction. http://nenya.ms.mff.cuni.cz/teaching/seminars/2000-05-31-kuhn-ttcp.html. 2000.*

* cited by examiner

*Primary Examiner*—Rupal Dharia
*Assistant Examiner*—Grant M. Ford
(74) *Attorney, Agent, or Firm*—Young & Thompson

(57) ABSTRACT

A protocol translation device realizes the merit of communications via the T/TCP protocol even if only one of devices in communication is compatible with T/TCP. The protocol translation device conducts protocol translation to relay communication packets sent and received between a TCP channel and a T/TCP channel, including a means for translating a T/TCP packet into a TCP packet by deleting a CC option and a CCnew option from the T/TCP packet, a means for translating a TCP packet into a T/TCP packet by adding CC, CCnew and/or CCecho options to the TCP packet and setting a CC value, and a means for assigning a value that is 16 bytes less than the maximum size of the packet to an MSS option for a communication device that communicates by the TCP protocol and instructing the communication device to transmit data with a packet that is 16 bytes or more smaller than the maximum size of the packet.

20 Claims, 2 Drawing Sheets

DEVICE, METHOD AND PROGRAM FOR PROTOCOL TRANSLATION

FIELD OF THE INVENTION

The present invention relates to protocol translation in communication networks, and more particularly to a protocol translation device for conducting protocol translation between the TCP protocol (Transmission Control Protocol) and the T/TCP protocol (Transaction TCP), a protocol translation method and a program thereof.

BACKGROUND OF THE INVENTION

On the IP network adopted for the Internet or LAN, the TCP protocol is commonly employed as a reliable communication protocol in various applications such as e-mail and a Web browser. The TCP protocol is standardized as RFC (Request for Comments) 793.

According to the TCP protocol, a process called 3WHS (3 Way Handshake) is executed when establishing a connection. In the 3WHS process, SYN, SYN ACK, and ACK packets are exchanged between a client and a server. Data are not transferred until the 3WHS process is completed.

In transaction-type (connection-oriented) communications via a protocol such as HTTP (Hyper Text Transfer Protocol) used for WWW (World Wide Web) and TCP, connect time per communication is generally short, and the 3WHS process constitutes a large portion of the cost. That is, the 3WHS process is performed with large overhead to the packets that are needed to transmit data, and also requires extra time to exchange packets for 3WHS. This is a serious problem for devices such as cellular phones that use wireless channels with narrow bands and long delay.

The T/TCP protocol is a protocol proposed to circumvent the 3WHS process in the TCP protocol, and defined by RFC1644. T/TCP circumvents the 3WHS by adding a serial number called CC (Connection Count) to the packet on each session. Therefore, the T/TCP protocol has the advantage over the TCP protocol in transmission speed and network traffic.

As is mentioned above, there are following problems in conventional IP network communications.

First, since the T/TCP protocol is not prevalent in the present circumstances, communication devices in general use are compatible only with the TCP protocol and there are few devices compatible with the T/TCP protocol. Besides, in order to establish communication via T/TCP, it is necessary that both sending device and receiving device are compatible with T/TCP. Even if either one of devices is compatible with T/TCP, the merit of T/TCP cannot be obtained. Consequently, in communication devices that are compatible with T/TCP, T/TCP is often disabled by default, and the T/TCP protocol has been hardly employed so far.

Second, in conventional communications via T/TCP, it is impossible to apply NAT (Network Address Translation).

SUMMARY OF THE INVENTION

It is therefore an object of the present invention to provide a protocol translation device, a protocol translation method and a program thereof, which realize the merit of the T/TCP protocol even in the case where only one of devices in communication is compatible with the T/TCP protocol by automatically translating the TCP protocol into the T/TCP protocol or vice versa to apply the T/TCP protocol to a part of a communication channel.

It is another object of the present invention to provide a protocol translation device, a protocol translation method and a program thereof, which realize T/TCP-based communications through NAT.

In accordance with the first aspect of the present invention, to achieve the above object, there is provided a protocol translation device, which conducts protocol translation to relay communication packets sent and received between a TCP channel and a T/TCP channel, including a means for translating the TCP protocol into the T/TCP protocol or the T/TCP protocol into the TCP protocol to transmit the packets.

In accordance with the second aspect of the present invention, in the first aspect, the protocol translation device further includes a means for translating a T/TCP packet into a TCP packet by deleting a CC option and a CCnew option from the T/TCP packet, and a means for translating a TCP packet into a T/TCP packet by adding CC, CCnew and/or CCecho options to the TCP packet and setting a CC value(s).

In accordance with the third aspect of the present invention, in the second aspect, the protocol translation device assigns a value that is 16 bytes less than the maximum size of the packet to an MSS option for a communication device that communicates by the TCP protocol, and instructs the communication device to transmit data with a packet that is 16 bytes or more smaller than the maximum size of the packet.

In accordance with the fourth aspect of the present invention, in one of the first to third aspects, the protocol translation device computes a check sum value included in a header of a packet to compensate the value when translating the packet and updates the check sum value.

In accordance with the fifth aspect of the present invention, in one of the first to forth aspects, the protocol translation device further includes a means for uniquely identifying devices that send and receive packets in reference to the address of the devices and a port number, and a means for recording a setting to specify whether or not protocol translation is necessary and a setting to specify a type of translation when protocol translation is necessary, wherein the protocol translation device conducts protocol translation to relay the packets based on the protocol translation settings of the devices at sending end and receiving end.

In accordance with the sixth aspect of the present invention, in one of the first to fifth aspects, the protocol translation device further includes a means for automatically detecting whether the protocol applied to a communication channel is the T/TCP protocol or the TCP protocol, and establishes communication by the detected protocol.

In accordance with the seventh aspect of the present invention, in one of the first to sixth aspects, the protocol translation device has a built-in NAT capability, and updates the CC value(s) included in the CC, CCnew and/or CCecho options of the received T/TCP packet to a CC value(s) generated by the translation device itself.

In accordance with the eighth aspect of the present invention, in one of the first to seventh aspects, the protocol translation device relays transmissions between a client and a server.

In accordance with the ninth aspect of the present invention, in one of the first to eighth aspects, the protocol translation device, which sends and receives packets via the T/TCP protocol on a channel to the client, and sends and receives packets via the TCP protocol on a channel to the server, relays transmissions between the client and the server by translating the T/TCP protocol and the TCP protocol.

In accordance with the tenth aspect of the present invention, there is provided a protocol translation method for conducting protocol translation to relay communication packets sent and received through a TCP channel and a T/TCP channel, comprising the steps of translating the TCP protocol into the T/TCP protocol to transmit the packets, and translating the T/TCP protocol into the TCP protocol to transmit the packets.

In accordance with the eleventh aspect of the present invention, in the tenth aspect, the protocol translation method further comprises the steps of translating a T/TCP packet into a TCP packet by deleting a CC option and a CCnew option from the T/TCP packet, and translating a TCP packet into a T/TCP packet by adding CC, CCnew and/or CCecho options and setting a CC value(s) to the TCP packet.

In accordance with the twelfth aspect of the present invention, in the eleventh aspect, the protocol translation method further comprises the steps of assigning a value that is 16 bytes less than the maximum size of the packet to an MSS option for a communication device that communicates by the TCP protocol, and instructs the communication device to transmit data with a packet that is 16 bytes or more smaller than the maximum size of the packet.

In accordance with the thirteenth aspect of the present invention, in one of the tenth to twelfth aspects, the protocol translation method further comprises the steps of uniquely identifying devices that send and receive packets in reference to the address of the devices and a port number, and recording a setting to specify whether or not protocol translation is necessary and a setting to specify a type of translation when protocol translation is necessary, wherein protocol translation to relay the packets is conducted based on the protocol translation settings of the devices at sending end and receiving end.

In accordance with the fourteenth aspect of the present invention, there is provided a protocol translation program for conducting protocol translation to relay communication packets sent and received through a TCP channel and a T/TCP channel by controlling a computer, executing the processes of translation from the TCP protocol into the T/TCP protocol and from the T/TCP protocol into the TCP protocol to transmit the packets.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
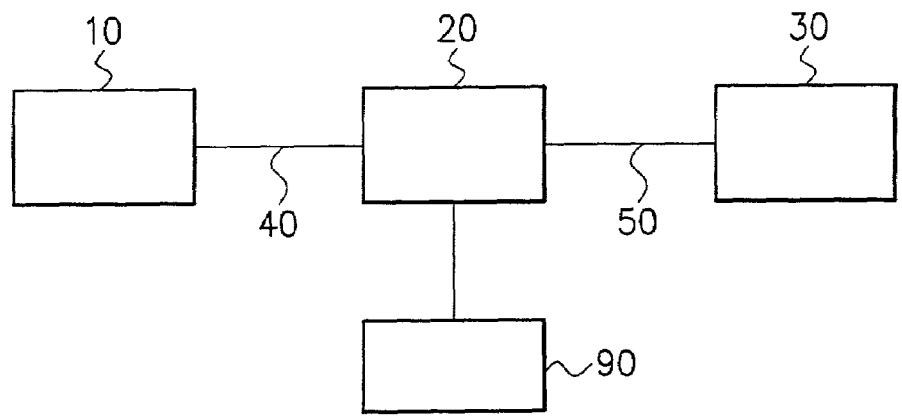
FIG. 1 is a block diagram showing a network construction provided with a protocol translation device according to the first embodiment of the present invention.

Referring now to the drawings, a description of preferred embodiments of the present invention will be given in detail.

FIG. 1 is a block diagram showing an example of a network construction provided with a protocol translation device according to the first embodiment of the present invention. The protocol translation device performs protocol translation between the TCP protocol and the T/TCP protocol.

As shown in FIG. 1, a translation device 20 (protocol translation device) of this embodiment is placed between two communication devices, that is, a client 10 and a server 30, and translates protocols applied to the transmission between the client 10 and the server 30.

In an example of FIG. 1, the client 10 is compatible with the T/TCP protocol, and the server 30 is compatible with only the TCP protocol. The translation device 20 performs protocol translation to relay the data transmitted by T/TCP from the client 10 side and the data transmitted by TCP from the server 30 side.

The translation device 20 automatically performs the protocol translation, and thus enabling the transmission through a first channel 40 between the client 10 and the device 20 by the T/TCP protocol as well as the transmission through a second channel 50 between the server 30 and the device 20 by the TCP protocol. Accordingly, it is made possible to transmit data via T/TCP on the first channel 40, which improves transmission speed and reduces network traffic.

In addition, the translation device 20 does not translate the address of transmitted data packets. Consequently, the client 10 and the server 30 can operate as if they directly communicated with each other without the device 20. Moreover, it is not required to make alterations in the software and hardware.

Incidentally, there are no special limitations on types of communications. The translation device 20 may perform protocol translation for any type of communication between various communication devices in any type of relation. Further, devices on the market may be used freely as the client 10 and the server 30.

Figure 2:
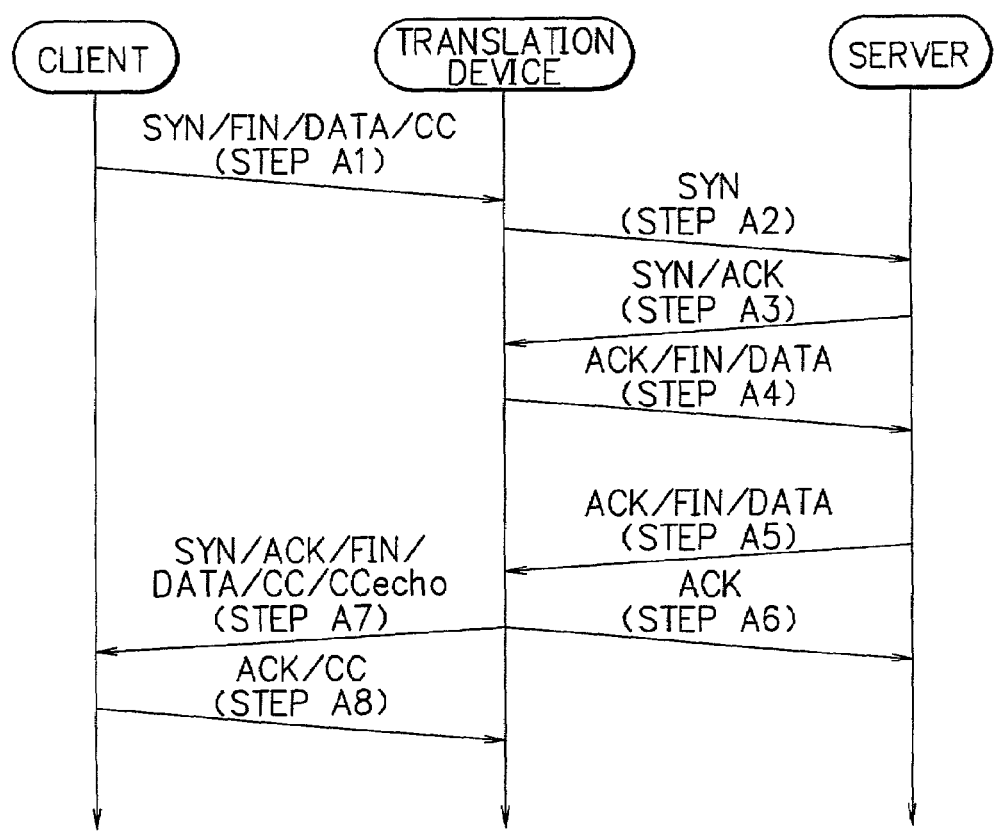
FIG. 2 is a sequence diagram showing protocol translation operation according to the first embodiment of the present invention.

FIG. 2 is a sequence diagram illustrating the transmission between the translation device 20 and other communication devices (client 10 and server 30) when the device 20 relays data between the client 10 and server 30.

According to the T/TCP protocol, the client 10 first sends a packet including a set of SYN, FIN and DATA (step A1). "SYN" indicates a request for connection, and is a signal for starting a communication via TCP or T/TCP. "FIN" is a signal indicating the end of the communication, and "DATA" represents the data to be sent to the other party.

On the other hand, according to the TCP protocol, the FIN DATA cannot be transmitted at the time of the connection request. Therefore, when receiving the packet from the client 10, the translation device 20 records the FIN DATA, and sends a packet in which only the SYN is set to the server 30 as a request for connection (step A2).

Having received the packet with the SYN, the server 30 determines whether or not to accept the connection request, and sends a packet including a set of SYN and ACK when the request is accepted (step A3). "ACK" is used as a confirmatory response, and in this case, indicates the acknowledgment of the connection request (SYN).

Subsequently, the translation device 20 sends an ACK to the server 30 in response to the connection request (SYN) received at step A3 together with the FIN DATA received at step A1 (step A4). At this point, the device 20 recognizes that the connection to the server 30 by TCP is settled.

On receipt of the DATA, the server 30 processes the received DATA, sends a response, and disconnects the connection. This process is executed under the control of, for example, application software. Thereby, response DATA, an ACK as an acknowledgement of the DATA received at step A4, and an FIN indicating the end of the connection are sent from the server 30 (step A5).

The translation device 20 acknowledges the end of the connection with the server 30 by the FIN sent from the server 30, and returns an ACK to the server 30 in response to the FIN (step A6).

Besides, having received the response DATA from the server 30, the device 20 sends the response DATA to the client 10 with the FIN indicating the end of the connection and the ACK received as a confirmatory response to the SYN FIN DATA sent from the client 10 at step A1 (step A7).

On receipt of the response DATA and the FIN, the client 10 acknowledges the end of the connection, and ends up returning an ACK as an acknowledgement of the FIN (step A8). The device 20 recognizes that the connection to the client 10 is disconnected by the ACK.

As can be seen in FIG. 2, five packets are needed on the second channel 50 since the data are transmitted via TCP. On the other hand, only three packets are used on the first channel 40 where the data are transmitted via T/TCP. Additionally, while the packets are sent and received twice through the second channel 50, the packets are sent and received only once through the first channel 40.

In the process of protocol translation between the TCP protocol and the T/TCP protocol, it must be noted that a T/TCP-proprietary option called a CC or CCnew is added to the data sent from the client 10. With the TCP protocol, the option cannot be interpreted, and therefore the translation device 20 deletes the option before sending packets to the server 30.

On the other hand, when the server 30 sends packets to the client 10, the translation device 20 adds the CC option to the packets. In addition, at above step A7, the device 20 also adds a CCecho option. It is necessary to set a connection count called CC value for each of the options. The device 20 generates the CC value.

Besides, there is the case where the size of a packet exceeds the maximum transmission unit (MTU) allowed on networks when the device 20 adds the CC and CCecho options to the packet. In order to avoid this, the device 20 adjusts an MSS (Maximum Segment Size) option included in the packet at step A2.

The MSS option is an option for determining the amount of data included in a packet based on the maximum size of the T/TCP protocol options. Since 8 bytes are required for storing each of the CC and CCecho options, the device 20 reduces the value of the MSS option by 16 bytes in advance at step A2. Thereby the server 30 sends a packet that is 16 bytes smaller than the MTU, and thus the device 20 can add the CC and CCecho options to the packet.

Moreover, when the translation device 20 translates a part of content in a packet, check sum values included in an IP header and a TCP protocol header become unequal. Therefore, the device 20 conducts a corrective computation of the check sum value along with the translation of the packet.

As is described above, the translation device 20 in the first embodiment automatically translates the TCP protocol into the T/TCP protocol or vice versa to relay transmissions by the T/TCP protocol and transmissions by the TCP protocol.

In the following, the second embodiment of the present invention will be described.

While in the first embodiment, the process of relaying data between a device that communicates via TCP and a device that communicates via T/TCP has been described in connection with FIG. 2, the present invention may be applied to the case where both devices communicate via T/TCP (or TCP). In this case, the translation device 20 automatically detects whether the respective devices employ the T/TCP protocol or the TCP protocol, and deals with data over the detected protocol.

For example, if both the client 10 and the server 30 are compatible with the T/TCP protocol in the example of FIG. 1, effective transmission via T/TCP can be implemented on the second channel 50 as well as on the first channel 40.

Figure 3:
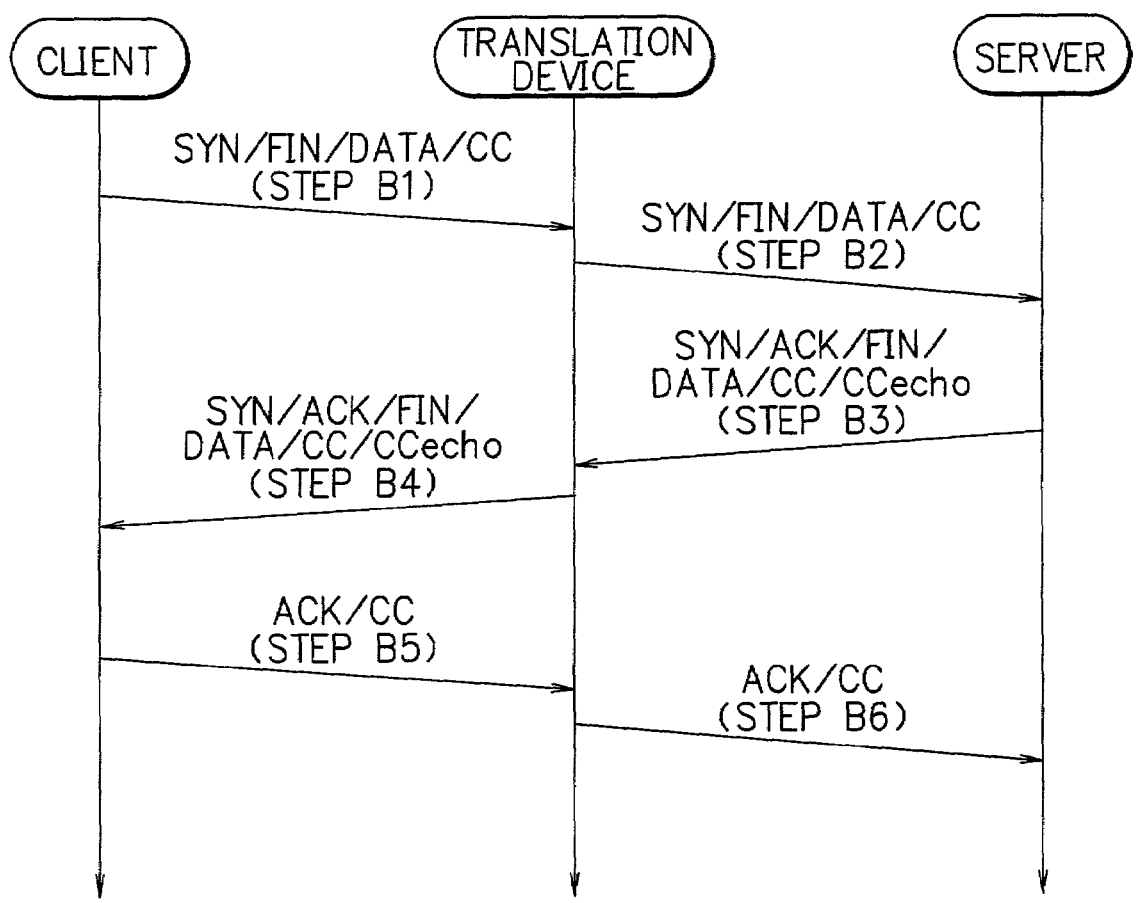
FIG. 3 is a sequence diagram showing protocol translation operation according to the second embodiment of the present invention.

FIG. 3 is a sequence diagram showing protocol translation operation according to the second embodiment of the present invention. While a packet including only a SYN is sent at step A2 in the first embodiment, the translation device 20 directly sends a packet with a set of SYN, FIN and DATA received at step B1 to the server 30 in this embodiment (step B2). When the packet sent from the server 30 as a response at step B3 does not include a CCecho option, which means that the server 30 is not compatible with the T/TCP protocol, then the operation of the first embodiment illustrated in FIG. 2 is executed afterwards.

When a CCecho option is included in the packet at step B3, it can be determined that the server 30 is compatible with the T/TCP protocol. Thus, the translation device 20 directly sends the packet to the client 10 (step B4).

In this case, the translation device 20 does not perform protocol translation, and the client 10 and the server 30 directly communicate with each other via T/TCP. The same applies to the case where both devices communicate via TCP.

Next, the third embodiment of the present invention will be explained. In this embodiment, NAT (Network Address Translator) is added to the translation device 20 of the second embodiment.

Generally with the NAT, CC values become mismatched and the T/TCP protocol does not operate properly. This is because the NAT translates the source address of a packet, to which the CC value corresponds.

Consequently, when including the NAT, the translation device 20 rewrites the CC values included in CC, CCnew and CCecho options into values that the device 20 generates. Accordingly, it is made possible to use the NAT in the transmission via T/TCP.

In the following, the fourth embodiment of the present invention will be explained. While in the first embodiment, protocol translation is performed between a pair of devices which send and receive data (the client 10 and the server 30) illustrated in FIG. 1, the present invention is not restricted to this construction. Protocol translation may be performed between three or more devices.

For example, there may be provided a plurality of clients 10 and servers 30 in FIG. 1, and the translation device 20 may perform multiple protocol translation processes at the same time. In order to implement this, the translation device 20 uniquely identifies each session to process based on the address of the respective devices and a port number, and manages the information of each session individually.

In addition, since the operation of the translation device 20 for the client 10 and the server 30 is symmetrical, the client 10 and the server 30 may be counterchanged. That is, while in the example of the first embodiment, the client 10 communicates via T/TCP and the server 30 communicates via TCP, this may be counterchanged.

Furthermore, in the case where protocol translation is performed for three or more communication devices, the translation device may deal with a client that communicates via T/TCP and a client that communicates via TCP at the same time.

Furthermore, each of the above-mentioned embodiments can be implemented in any combination.

Incidentally, the protocol translation device according to the above embodiments can be realized by loading a protocol translation program, that is, a computer program for implementing the function of protocol translation and other functions into a memory of a computer, in addition to realizing the functions in hardware. The protocol translation program is stored in a magnetic disc, a semiconductor memory, or other recording medium 90 depicted in FIG. 1, and loaded therefrom into the computer. Thus, the protocol translation program controls the operation of the computer, and implements each of the functions.

While preferred embodiments of the present invention have been described, it is not to be restricted by those embodiments. It is to be appreciated that those skilled in the art can change or modify the embodiments without departing from the scope and spirit of the present invention.

As set forth hereinabove, the protocol translation device in accordance with the present invention can automatically translate the T/TCP protocol into the TCP protocol or the TCP protocol into the T/TCP protocol to relay transmissions via the T/TCP protocol and transmissions via the TCP protocol. Therefore, with the protocol translation device of the present invention, even if a communication device at one end in communication is compatible only with the TCP protocol, a communication device at the other end that is compatible with the T/TCP protocol can communicates effectively by T/TCP in between the communication device itself and the protocol translation device. Accordingly, it is made possible to improve transmission speed and reduce network traffic. Besides, there can be obtained other effects, for example, a communication charge is reduced. Better effects may be achieved in wireless channels with narrow bands and long delay.

Furthermore, since the protocol translation device of the present invention automatically translates the content of transmitted packets when relaying the packets, communication devices (the client 10 and server 30 in FIG. 1) does not need to have an extra function. Consequently, the communication devices can communicate as usual with each other via the TCP protocol and the T/TCP protocol, respectively, without making changes in the software and hardware of the communication devices.

While the preferred embodiments of the present invention have been described using specific terms, such description is for illustrative purposes only, and it is to be understood that changes and variations may be made without departing from the spirit or the scope of the following claims.

What is claimed is:

1. A protocol translation device connected to a client device through a T/TCP communications channel and to a server through a TCP communication channel, said translation device deleting CC components included in T/TCP messages, recording communication termination and DATA components from the T/TCP messages received from said client device over the T/TCP communication channel, sending connection request components to said server over the TCP communication channel as part of a three-way handshake (3WHS) to establish communication with said server, and after receipt of an ACK message from said server, adding the ACK message to the communication termination and DATA components for transmission to said server over the TCP communication channel.

2. The protocol translation device claimed in claim 1, wherein the connection request components are SYN components and the communication termination components are FIN components.

3. The protocol translation device claimed in claim 1, wherein the device assigns a value that is 16 bytes less than the maximum size of the packet to an MSS option for a communication device that communicates by the TCP protocol, and instructs the communication device to transmit data with a packet that is 16 bytes or more smaller than the maximum size of the packet.

4. The protocol translation device claimed in claim 1, wherein the device computes a check sum value included in a header of a packet to compensate the value when translating the packet and updates the check sum value.

5. The protocol translation device claimed in claim 1, further including:
   a means for uniquely identifying devices that send and receive packets in reference to an address of each of the respective devices and a port number; and
   a means for recording a setting to specify whether protocol translation is necessary and a setting to specify a type of translation when protocol translation is necessary; wherein
   the protocol translation device conducts protocol translation to relay packets based on protocol translation settings of a sender and a receiver.

6. The protocol translation device claimed in claim 1, further including a means for automatically detecting whether a protocol applied to a communication channel is the T/TCP protocol or the TCP protocol, and establishing communication by the detected protocol.

7. The protocol translation device claimed in claim 1, which has a built-in NAT capability, and updates a CC value included in CC, CCnew and/or CCecho options of a received T/TCP packet to a CC value generated by the translation device itself.

8. A protocol translation method for conducting protocol translation to relay communication packets to a server through a TCP channel and to a client device through a T/TCP channel, comprising the steps of:
   deleting CC components included in T/TCP messages;
   recording communication termination and DATA components from the T/TCP messages received from said client device over the T/TCP communication channel;
   sending connection request components to said server over the TCP communication channel as part of a three-way handshake (3WHS) to establish communication with said server; and
   adding an ACK message to the communication termination and DATA components for transmission to said server over the TCP communication channel after receipt of the ACK message from said server.

9. The protocol translation method claimed in claim 8, wherein the connection request components are SYN components and the communication termination components are FIN components.

10. The protocol translation method claimed in claim 8, further comprising the steps of:
   assigning a value that is 16 bytes less than the maximum size of a packet to an MSS option for a communication device that communicates by the TCP protocol; and
   instructing the communication device to transmit data with a packet that is 16 bytes or more smaller than the maximum size of the packet.

11. The protocol translation method claimed in claim 8, further comprising the steps of:
  uniquely identifying devices that send and receive packets in reference to an address of each device and a port number; and
  recording a setting to specify whether protocol translation is necessary and a setting to specify a type of translation when protocol translation is necessary; wherein
  protocol translation to relay the packets is conducted based on the protocol translation settings of a sender and a receiver.

12. A protocol translation program stored in a tangible memory for conducting protocol translation to relay communication packets to a server through a TCP channel and to a client through a T/TCP channel, causing a computer to execute the steps of:
  deleting CC components included in T/TCP messages;
  recording communication termination and DATA components from the T/TCP messages received from said client device over the T/TCP communication channel;
  sending connection request components to said server over the TCP communication channel as part of a three-way handshake (3WHS) to establish communication with said server; and
  adding an ACK message to the communication termination and DATA components for transmission to said server over the TCP communication channel after receipt of the ACK message from said server.

13. The protocol translation program claimed in claim 12, wherein the connection request components are SYN components and the communication termination components are FIN components.

14. The protocol translation program claimed in claim 12, further causing the computer to execute the steps of:
  assigning a value that is 16 bytes less than the maximum size of a packet to an MSS option for a communication device that communicates by the TCP protocol; and
  instructing the communication device to transmit data with a packet that is 16 bytes or more smaller than the maximum size of the packet.

15. The protocol translation program claimed in claim 12, further causing the computer to execute the steps of:
  uniquely identifying devices that send and receive packets in reference to the address of each device and a port number; and
  recording a setting to specify whether protocol translation is necessary and a setting to specify a type of translation when protocol translation is necessary; wherein
  protocol translation to relay the packets is conducted based on the protocol translation settings of the devices at a sender and a receiver.

16. A protocol translation system, comprising:
  a client device that communicates using T/TCP messages containing SYN, FIN, DATA and CC components;
  a server that communicates using TCP messages that establish communication with a three-way handshake (3WHS); and
  a translation device that is connected to said client device through a T/TCP communication channel and that is connected to said server through a TCP communication channel, said translation device deleting the CC component, recording the FIN and DATA components from the T/TCP messages received from said client device over the T/TCP communication channel, sending the SYN component to said server over the TCP communication channel as part of the 3WHS to establish communication with said server, and after receipt of an ACK message from said server, adding the ACK message to the FIN and DATA components for transmission to said server over the TCP communication channel.

17. The system of claim 16, wherein said translation device adds further CC components to the TCP messages received from said server for transmission to said client device over the T/TCP communication channel.

18. The device of claim 1, wherein said translation device adds CC components to TCP messages received from said server for transmission to said client device over the T/TCP communication channel.

19. The method of claim 8, further comprising the steps of adding CC components to TCP messages received from said server for transmission to said client device over the T/TCP communication channel.

20. The program of claim 12, further causing the computer to execute the step of adding CC components to TCP messages received from said server for transmission to said client device over the T/TCP communication channel.

* * * * *